(12) United States Patent
Jiang

(10) Patent No.: US 8,948,288 B2
(45) Date of Patent: Feb. 3, 2015

(54) GENERATION AND USE OF LDCS IN WIRELESS COMMUNICATION SYSTEMS

(75) Inventor: Ming Jiang, Guangzhou (CN)

(73) Assignee: Samsung Electronics Co., Ltd., Suwon-si (KR)

(*) Notice: Subject to any disclaimer, the term of this patent is extended or adjusted under 35 U.S.C. 154(b) by 1316 days.

(21) Appl. No.: 12/540,770

(22) Filed: Aug. 13, 2009

(65) Prior Publication Data

US 2010/0040165 A1 Feb. 18, 2010

(30) Foreign Application Priority Data

Aug. 14, 2008 (GB) .................................. 0814870.2

(51) Int. Cl.
*H04B 7/02* (2006.01)
*H04L 1/06* (2006.01)

(52) U.S. Cl.
CPC .................................. *H04L 1/0643* (2013.01)
USPC ........................................................ 375/267

(58) Field of Classification Search
USPC ........................ 375/295, 299, 259, 260, 267
See application file for complete search history.

(56) References Cited

U.S. PATENT DOCUMENTS

| | | | |
|---|---|---|---|
| 7,366,248 B2 * | 4/2008 | Wang et al. | 375/267 |
| 7,583,747 B1 * | 9/2009 | Damen et al. | 375/267 |
| 2002/0044611 A1 * | 4/2002 | Hassibi et al. | 375/267 |
| 2006/0018403 A1 * | 1/2006 | Wang et al. | 375/299 |

OTHER PUBLICATIONS

B.Hassibi et al., High-rate codes that are linear in space and time, IEEE Trans. Inf. Theory, Apr. 24, 2001, pp. 1804-1824, vol, 48, No. 7.
S.M. Alamouti, A simple transmitter diversity scheme for wireless communications, IEEE J. Select. Areas Commun., Oct. 1998, pp. 1451-1458, vol. 16, No. 8.
V. Tarokh et al., Space-time block codes from orthogonal designs, IEEE Trans. Inform. Theory, Jul. 1999, pp. 1456-1467, vol. 45, No. 5.
G.J. Foschini et al., Simplified processing for high spectral efficiency wireless communication employing multi-element arrays, IEEE J. Select. Areas Commun., Nov. 1999, pp. 1841-1852, vol. 17. No. 11.
R.W. Heath et al., Linear dispersion codes for MIMO systems based on frame theory, IEEE Trans. Signal Process., Oct. 2002, pp. 2429-2441, vol. 50, No. 10.

(Continued)

*Primary Examiner* — Vineeta Panwalkar
(74) *Attorney, Agent, or Firm* — Jefferson IP Law, LLP

(57) ABSTRACT

A method for generating a Linear Dispersion Code (LDC) for use in a Multiple-Input Multiple-Output (MIMO) communication system in which M transmit antennas are used to transmit a codeword over T time slots, each codeword encoding Q constellation symbols, is provided. The method includes determining M, T and Q, wherein M, T and Q are real numbers, generating a first matrix having 2Q columns and a predefined number m of rows, each column including a plurality of elements, each element being a real number within a respective predefined range for the respective row, deriving a second matrix having 2Q columns and m rows from the first matrix such that the elements of one row of the second matrix are dependent upon the corresponding elements of a corresponding row of the first matrix, and upon M and T, and deriving a set of 2Q LDC dispersion matrices, each including dimensions T×M, from the second matrix.

26 Claims, 8 Drawing Sheets

(56) References Cited

OTHER PUBLICATIONS

R.H. Gohary et al., Design of linear dispersion codes: asymptotic guidelines and their implementation, IEEE Trans. Wireless Commun., Nov. 2005, pp. 2892-2906, vol. 4, No. 6.

X. Wang et al., Stochastic gradient algorithms for design of minimum error-rate linear dispersion codes in MIMO wireless systems, IEEE Trans. Signal Process., Apr. 2006, pp. 1242-1255, vol. 54, No. 4.

M.O. Damen et al, Diagonal algebraic space-time block codes, IEEE Trans. Inform. Theory, Mar. 2002, pp. 628-636, vol. 48, No. 3.

M.O. Damen et al., on diagonal algebraic space-time block codes, IEEE. Trans. Commun., Jun. 2003, pp. 911-919, vol. 51, No. 6.

H. El Gamal et al., On the design of algebraic space-time codes for MIMO block-fading channels, IEEE. Trans. Inform. Theory, Jan. 2003, pp. 151-163, vol. 49, No. 1.

H. El Gamal et al., Universal space-time coding, IEEE Trans. Inform. Theory, May 2003, pp. 1097-1119, vol. 49, No. 5.

J.C. Belfiore et al., The golden code: a 2×2 full-rate space-time code with nonvanishing determinants, IEEE. Trans. Inform. Theory, Apr. 2005, pp. 1432-1436, vol. 51, No. 4.

F. Oggier et al., Perfect Space-Time Block Codes, IEEE. Trans. Inform. Theory, Sep. 2006, pp. 3885-3902, vol. 52, No. 9.

F. Mezzadri, How to Generate Random Matrices from the Classical Compact Groups, Notices of the AMS, May 2007, pp. 592-604, vol. 54, No. 5.

G.H. Goulb et al., Matrix Computations, The Johns Hopkins Univ. Press, 1996, 3rd ed. Baltimore, MD.

M. Pozniak et al., Composed Ensembles of Random Unitary Matrices, Journal of Physics A: Mathematical and General, 1998, pp. 1059-1071, vol. 31, No. 3.

G.H. Golub et al., Matrix Computations, The Johns Hopkins University Press, 1996, 3rd ed.

\* cited by examiner

GENERATION AND USE OF LDCS IN WIRELESS COMMUNICATION SYSTEMS

PRIORITY

This application claims the benefit under 35 U.S.C. §119(a) of a United Kingdom patent application filed on Aug. 14, 2008 in the European Patent Office and assigned Serial No. 0814870.2, the entire disclosure of which is hereby incorporated by reference.

BACKGROUND TO THE INVENTION

1. Field of the Invention

The present invention relates to Linear Dispersion Codes (LDCs). More particularly, the present invention relates to generating LDCs for use in Multiple-Input Multiple-Output (MIMO) wireless communication systems.

2. Description of the Related Art

In wireless MIMO communication systems, there is a trade-off between spectral efficiency and a signal's robustness. The trade-off is also referred to as a rate-diversity trade-off. In order to achieve a higher reliability, redundancy has to be added to an original signal, which results in a reduction of spectral efficiency. On the other hand, if a higher spectral efficiency is maintained, the signal becomes more vulnerable due to increased level of interference. Therefore, it is beneficial to find a good trade-off which ensures both high robustness and spectral efficiency.

The reference numerals [1]-[17] made in the below description correspond to the references listed at the end of the description, contents of each are hereby incorporated by reference.

Conventional Linear Dispersion Codes (LDCs) (see references [1] and [5]) have been proven to be able to provide a good rate-diversity trade-off. The concept of LDC in reference [1] provides a space-time coding framework. Based on specific criteria, LDC disperses a transmission signal across space and time (frequency) dimensions, exploiting both spatial and time (frequency) diversity. By design, the LDC subsumes a wide range of Space-Time Codes (STC), for example an Alamouti code in reference [2], Tarokh codes in reference [3], and a Vertical Bell Labs Layered Space-Time (V-BLAST) scheme in reference [4], also generally known as Spatial Multiplexing (SM).

The existing LDC designs mainly rely on one of the following methods:

Conventional STC designs, e.g., the Alamouti code in reference [2] and the Tarokh codes in reference [3];

Gradient-based search algorithms, e.g., Hassibi et al. in reference [1], Gohary et al. in reference [6], and Wang et al. in reference [7];

Frame theory, e.g., Heath et al. in reference [5]; and

Algebraic theory, e.g., the Diagonal Algebraic Space-Time (DAST) codes in references [8] and [9], the Threaded Algebraic Space-Time (TAST) codes in references [10] and [11], a golden code in reference [12], and perfect codes in reference [13].

Constructing an LDC is equivalent to generating a set of encoding matrices. Structure of the encoding matrices has a significant impact on the code's achievable performance.

Conventional STCs, e.g., the Alamouti code in reference [2] and the Tarokh codes in reference [3], which can be perfectly represented in the LDC form, were created following a principle of orthogonal design. However, it has been shown that non-orthogonal codes generally outperform orthogonal codes in high-rate scenarios in references [1], [5] and [6].

For non-orthogonal LDCs, one can resort to frame theory as suggested by Heath et al. in reference [5], where projection-based and unitary-based parameterization algorithms are proposed. A first approach adopts QR-decomposition to generate unitary dispersion matrices. However, the result of QR-decomposition is not unique and is not distributed with Haar measure in reference [14]. The second approach in reference [5] exploits Householder reflections in reference [15] to produce candidate unitary matrices, though some implementation issues for the determination of Householder matrices need to be considered, for instance an improper choice of a sign can result in numerical instability in reference [15].

Alternatively, Givens rotations in reference [15] can also be used in reference [6]. However, Givens rotations are less numerically stable than Householder reflections. Further, Givens rotations can only generate a constrained set of unitary matrices, which slightly limits search space.

Another possibility is to exploit algebraic theory, which led to the present invention of the DAST codes in references [8] and [9], the TAST codes in references [10] and [11], and the perfect codes in reference [13]. However, the design of these codes has resulted in some constraints. For example, DAST codes may outperform orthogonal codes in high dimensions only, such as with four transmit antennas in reference [8]. Perfect codes were found only in specific scenarios, namely for dimensions of 2×2, 3×3, 4×4, and 6×6, respectively, where dimension 2×2 is representative of the Golden Code in reference [12].

Known criteria for LDC optimization include ergodic channel capacity or Mutual Information (MI) in reference [1], Pair-wise Error Probability (PEP) in reference [3], Block Error Probability (BLEP) in reference [7], and the like. Due to a non-convex nature of cost functions, numerical methods, such as, for example, gradient-based search algorithms in references [1], [6] and [7], have been proved to be more convenient and effective.

The LDC is defined by a set of dispersion matrices which have a large number of entries. Depending on the optimization criterion adopted, theoretical analysis may be possible. However, in most of the known cases, numerical methods are proved to be more effective for finding good LDCs.

Certain known methods employ gradient-based methods, either classical ones or their variations, to conduct a search for LDCs. For example, a stochastic gradient algorithm was used in reference [7], which however can only converge to a local minimum.

As mentioned above, LDCs in references [1] and [5] have been proven to be able to provide a good rate-diversity trade-off. Depending on the design method, the structure and performance of LDC can vary significantly. A new way of constructing LDCs provides a convenient way to transform a set of predefined parameter vectors to a set of linear dispersion matrices, which fully define an LDC.

In a random unitary matrix theory, certain design methods are capable of exploring unconstrained and full space of unitary matrices, where new LDCs, superior to existing solutions, can be found.

Depending on practical application scenarios, the dimensions of the new LDCs generated can be arbitrarily square or non-square, thus providing a high flexibility for design and application.

Design methods may also be conveniently combined with any appropriate numerical optimization algorithms to search for new codes.

In contrast, unitary LDCs have been shown to be asymptotic optimal in reference [6]. By construction, certain new design methods exploring an entire space of unitary matrices according to the unique Haar measure, where optimized unitary LDCs with better performance than their existing counterparts can be found. Moreover, by using the design framework, the production of LDCs with flexible dimensions for both square and non-square cases can be facilitated.

Depending on the optimization method (used to select an LDC), the performance of the LDC can vary significantly. A new way of searching for optimized LDCs (i.e., a new way of determining an optimum LDC) may be introduced, which exploit a specifically designed and tuned Genetic Algorithm (GA). Genetic Algorithms (GAs), on the other hand, provide a power global optimization method that is efficient for complicated non-linear problems.

Furthermore, taking into account the constraints of the LDC optimization problem, the GA adopted in certain optimization frameworks is based on a real matrix encoding. Compared with the widely-used binary encoding, real encoding has the benefit of providing more degree of freedom in terms of increasing search granularity.

Moreover, by exploiting a unitary matrix transformation mechanism, the customized GA-based framework in certain embodiments can provide a full search for the unitary matrix space, where better LDCs can be found.

Therefore, a need exists for a method for generating LDCs for use in Multiple-Input Multiple-Output (MIMO) wireless communication systems.

SUMMARY OF THE INVENTION

An aspect of the present invention is to address at least the above-mentioned problems and/or disadvantages and to provide at least the advantages described below. Accordingly, an aspect of the present invention is to provide a method for generating Linear Dispersion Codes (LDCs) for use in Multiple-Input Multiple-Output (MIMO) wireless communication systems.

In accordance with an aspect of the present invention, a method for generating an LDC for use in a MIMO communication system in which M transmit antennas are used to transmit a codeword over T time slots, each codeword encoding Q constellation symbols, is provided. The method includes determining M, T and Q, wherein M, T and Q are real numbers, generating a first matrix having 2Q columns and a predefined number m of rows, each column comprising a plurality of elements and each element being a real number within a respective predefined range for the respective row, deriving a second matrix having 2Q columns and m rows from the first matrix such that the elements of one row of the second matrix are dependent upon the corresponding elements of a corresponding row of the first matrix and upon M and T, and deriving a set of 2Q LDC dispersion matrices, each 2Q LDC dispersion matrix including dimensions T×M, from the second matrix.

In an exemplary implementation, the deriving of the set of 2Q LDC dispersion matrices includes constructing a set of rotated unitary matrices for each of the 2Q column vectors of the second matrix.

In an exemplary implementation, the deriving of the set of 2Q LDC dispersion matrices includes generating a set of 2Q unitary matrices, each unitary matrix being determined from a respective set of the rotated unitary matrices.

In an exemplary implementation, the deriving of the set of 2Q LDC dispersion matrices includes applying a power constraint to the set of 2Q unitary matrices to generate a corresponding set of 2Q power constrained unitary matrices.

In an exemplary implementation, the deriving of the set of 2Q LDC dispersion matrices includes constructing the set of 2Q LDC dispersion matrices from the set of 2Q power constrained unitary matrices.

In an exemplary implementation, the constructing of the set of 2Q LDC dispersion matrices is dependent upon relative sizes of T and M.

In an exemplary implementation, the predefined number m is equal to 4.

In an exemplary implementation, the first matrix is a matrix $\Lambda$, where $$\Lambda = [\Lambda_1, \Lambda_2, \ldots, \Lambda_{2Q}],$$

wherein column vectors are given by:

$$\Lambda = [\psi_q^{(r,s)}, \chi_q^{(s)}, \xi_q^{(r,s)}, \alpha_q]^T, q=1, \ldots, 2Q, 0 \le r < s \le K-1, \text{ and}$$

$\psi_q^{(r,s)}, \chi_q^{(s)}, \alpha_q, \xi_q^{(r,s)}$ $q=1, \ldots, 2Q, 0 \le r < s \le K-1$ are real numbers within the predefined ranges:

$\psi_q^{(r,s)} \in [0, 2\pi), \chi_q^{(s)} \in [0, 2\pi), \xi_q^{(r,s)} \in [0,1), \alpha_q \in [0, 2\pi)$ and K is an integer equal to the larger of M and T, if M and T are not equal, or equal to M or T, if M and T are equal.

In an exemplary implementation, the deriving of the second matrix includes determining a vector $\phi$, where:

$$\phi = [\phi_1^{(r,s)}, \phi_2^{(r,s)}, \ldots, \phi_Q^{(r,s)}], \phi_q^{(r,s)} = \arcsin((\xi_q^{(r,s)})^{1/(2r+2)}), q=1, \ldots, 2Q, 0 \le r < s \le K-1.$$

In an exemplary implementation, the second matrix is a matrix $\Lambda'$:

$$\Lambda' = [\Lambda'_1, \Lambda'_2, \ldots, \Lambda'_{2Q}],$$

wherein column vectors are given by:

$$\Lambda'_q = [\psi_q^{(r,s)}, \chi_q^{(s)}, \phi_q^{(r,s)}, \alpha_q]^T, q=1, \ldots, 2Q, 0 \le r < s \le K-1.$$

In an exemplary implementation, the deriving of the set of 2Q LDC dispersion matrices includes, for each of the 2Q column vectors of $\Lambda'$, namely $\Lambda'_q$, $q=1, \ldots, 2Q$, constructing K−1 rotated unitary matrices $E_{q,k}$, $k=1, \ldots, K-1$:

$$E_{q,1} = E_q^{(K-1,K)}(\phi_q^{(0,1)}, \psi_q^{(0,1)}, \chi_q^{(1)})$$

$$E_{q,2} = E_q^{(K-2,K-1)}(\phi_q^{(1,2)}, \psi_q^{(1,2)}, 0) \cdot E_q^{(K-1,K)}(\phi_q^{(0,2)}, \psi_q^{(0,2)}, \chi_q^{(2)})$$

$$\vdots$$

$$E_{q,K-1} = E_q^{(1,2)}(\phi_q^{(K-2,K-1)}, \psi_q^{(K-2,K-1)}, 0) \cdot E_q^{(2,3)}(\phi_q^{(K-3,K-1)}, \psi_q^{(K-3,K-1)}, 0) \cdots \cdot E_q^{(K-1,K)}(\phi_q^{(0,K-1)}, \psi_q^{(0,K-1)}, \chi_q^{(K-1)}),$$

wherein the set of elementary unitary matrices $E_q^{(r,s)}(\phi_q^{(r,s)}, \psi_q^{(r,s)}, \chi_q^{(s)})$ are given by:

$$E_q^{(r,s)} = \begin{bmatrix} E_{q,11}^{(r,s)} & E_{q,12}^{(r,s)} & \ldots & E_{q,1K}^{(r,s)} \\ E_{q,21}^{(r,s)} & E_{q,22}^{(r,s)} & \ldots & E_{q,2K}^{(r,s)} \\ \vdots & \vdots & \ddots & \vdots \\ E_{q,K1}^{(r,s)} & E_{q,K2}^{(r,s)} & \ldots & E_{q,KK}^{(r,s)} \end{bmatrix},$$

where:

$E_{q,kk}^{(r,s)} = 1, k=1, \ldots, K; k \ne r, s$ $E_{q,rr}^{(r,s)} = \cos\phi_q^{(r,s)} \cdot \exp(j\psi_q^{(r,s)})$ $E_{q,rs}^{(r,s)} = \sin\phi_q^{(r,s)} \cdot \exp(j\chi_q^{(s)})$ $E_{q,sr}^{(r,s)} = -\sin\phi_q^{(r,s)} \cdot \exp(-j\chi_q^{(s)})$ $E_{q,ss}^{(r,s)} = \cos\phi_q^{(r,s)} \cdot \exp(-j\psi_q^{(r,s)}).$ In an exemplary implementation, the deriving of the set of 2Q LDC dispersion matrices includes determining a set of 2Q unitary matrices $\tilde{U}_q$, q=1, ..., 2Q according to:

$$\tilde{U}_q = \exp(j\alpha_q) \cdot E_{q,1} \cdot E_{q,2} \cdot \ldots \cdot E_{q,K-1}, \quad q=1, \ldots, 2Q.$$

In an exemplary implementation, the deriving of the set of 2Q LDC dispersion matrices includes applying a transmit power constraint to the unitary matrices to generate a set of power constrained unitary matrices according to:

$$U_q = \sqrt{\frac{K}{Q}} \cdot \tilde{U}_q.$$

In an exemplary implementation, the deriving of the set of 2Q LDC dispersion matrices includes deriving the LDC dispersion matrices from the power constrained unitary matrices based on a dimension requirement, such that:
if T=M, the dispersion matrices are given by $$\begin{cases} A_q = U_q, & q = 1, \ldots, Q \\ B_q = U_q, & q = Q+1, \ldots, 2Q, \end{cases}$$

if T<M, the dispersion matrices are given by $$\begin{cases} A_q = Mat(GetRows(U_q, T)), & q = 1, \ldots, Q \\ B_q = Mat(GetRows(U_q, T)), & q = Q+1, \ldots, 2Q, \end{cases}$$

wherein a function GetRows(U, T) denotes an operation of selecting T rows out of the K rows in matrix U, while a function Mat( ) denotes a matrixing operation with the selected T rows, namely to form a new T×M matrix into which the selected rows are fitted, and
if T>M, the dispersion matrices are given by $$\begin{cases} A_q = Mat(GetCols(U_q, M)), & q = 1, \ldots, Q \\ B_q = Mat(GetCols(U_q, M)), & q = Q+1, \ldots, 2Q, \end{cases}$$

wherein a function GetCols(U, M) denotes an operation of selecting M columns out of K columns in matrix U, while a function Mat( ) denotes a matrixing operation with the selected M columns, namely to form a new T×M matrix into which the selected columns are fitted.

In accordance with another aspect of the present invention, a method for generating at least a partially optimized LDC for use in a MIMO communication system in which M transmit antennas are used to transmit a codeword over T time slots, each codeword encoding Q constellation symbols, wherein M, T and Q are real numbers, is provided. The method includes generating a plurality of different LDCs, evaluating each LDC according to at least one criterion, and selecting one of the LDCs as the at least partially optimized LDC according to the results of the evaluation.

In an exemplary implementation, the method further includes generating an initial matrix having 2Q columns and a predefined number m of rows, each column comprising a plurality of elements, each element being a real number within a respective predefined range for the respective row, generating a population of different individual matrices from the initial matrix, each individual matrix having 2Q columns and m rows, each column comprising a plurality of elements and each element being a real number within the respective predefined range for the respective row, and each individual matrix being generated by operating on the initial matrix with a mutation operator, deriving a respective second matrix having 2Q columns and m rows from each individual matrix such that the elements of one row of each second matrix are dependent upon the corresponding elements of the corresponding row of the respective individual matrix and upon M and T, and deriving a respective set of 2Q LDC dispersion matrices, each dispersion matrix comprising dimensions T×M, from each second matrix.

In an exemplary implementation, the mutation operator includes a modulo operator and a reflection operator.

In an exemplary implementation, the method further includes selecting a plurality of the individual matrices according to the evaluation to form a mating pool, selecting pairs of the selected individual matrices from the mating pool to form a plurality of parent pairs, processing each parent pair to generate a respective two new individual matrices of a new generation of matrices, deriving a further set of LDCs, each corresponding to a respective one of the new individual matrices, and evaluating each new LDC according to the at least one criterion.

In an exemplary implementation, the processing of each parent pair includes at least one of a blending operation and a mutating operation.

In an exemplary implementation, the method further includes refining the new generation of matrices by replacing at least one of the new individual matrices with at least one of individual matrices from the previous generation.

In an exemplary implementation, the method further includes repeating the selecting of the pairs of the selected individual matrices, the generation of a new generation, the evaluation of LDCs, and optionally repeating the refining, for a predefined number of generations.

In an exemplary implementation, the selecting of one of the LDCs includes selecting the LDC having a highest evaluation according to the at least one criterion.

In accordance with still another aspect of the present invention, a communication method for transmitting data in a plurality of codewords from a plurality of transmit antennas, each codeword encoding a plurality of constellation symbols and each codeword being transmitted over a plurality of time slots, is provided. The method includes generating a plurality of LDCs comprising a respective set of LDC dispersion matrices and corresponding to a different respective combination of T, M and Q values, wherein T, M and Q are real numbers, storing the plurality of LDCs in a memory means, determining a number M1 of transmit antennas in the plurality of transmit antennas, determining a number Q1 of constellation symbols in the plurality of constellation symbols, determining a number T1 of timeslots in the plurality of time slots, selecting from the memory means an LDC corresponding to T, M and Q values equal to T1, M1 and Q1, respectively, wherein T1, M1 and Q1 are real numbers, using the selected LDC to encode data into a plurality of codewords, and transmitting the codewords from the M1 transmit antennas.

In an exemplary implementation, the method further includes selecting a new LDC from the memory means in response to at least one of the numbers T1, M1 and Q1 changing, the new LDC corresponding to T, M and Q values equal to the new values of T1, M1 and Q1, using the selected new LDC to encode data into a plurality of codewords, and transmitting the codewords from the M1 transmit antennas.

In accordance with yet another aspect of the present invention, a communication method for transmitting data in a plurality of codewords from M transmit antennas, each codeword encoding Q constellation symbols and each codeword being transmitted over T time slots, is provided. The method includes generating a plurality of different Linear Dispersion Codes (LDCs) including a respective set of LDC dispersion matrices and corresponding to a combination of M, T and Q, wherein M, T and Q are real numbers, determining a performance of the plurality of different LDCs according to at least one criterion, selecting one of the LDCs according to its performance, using the selected LDC to encode data into a plurality of codewords, and transmitting the codewords from the transmit antennas.

In an exemplary implementation, the generating of the plurality of different LDCs includes generating a plurality of different first matrices, each first matrix having 2Q columns and a predefined number m of rows, each column including a plurality of elements, each element being a real number within a respective predefined range for the respective row, deriving a respective second matrix having 2Q columns and m rows from each first matrix such that the elements of one row of each second matrix are dependent upon corresponding elements of a corresponding row of the respective first matrix and upon M and T, and deriving a respective set of 2Q LDC dispersion matrices, each 2Q LDC dispersion matrix includes dimensions T×M, from each of the second matrices.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
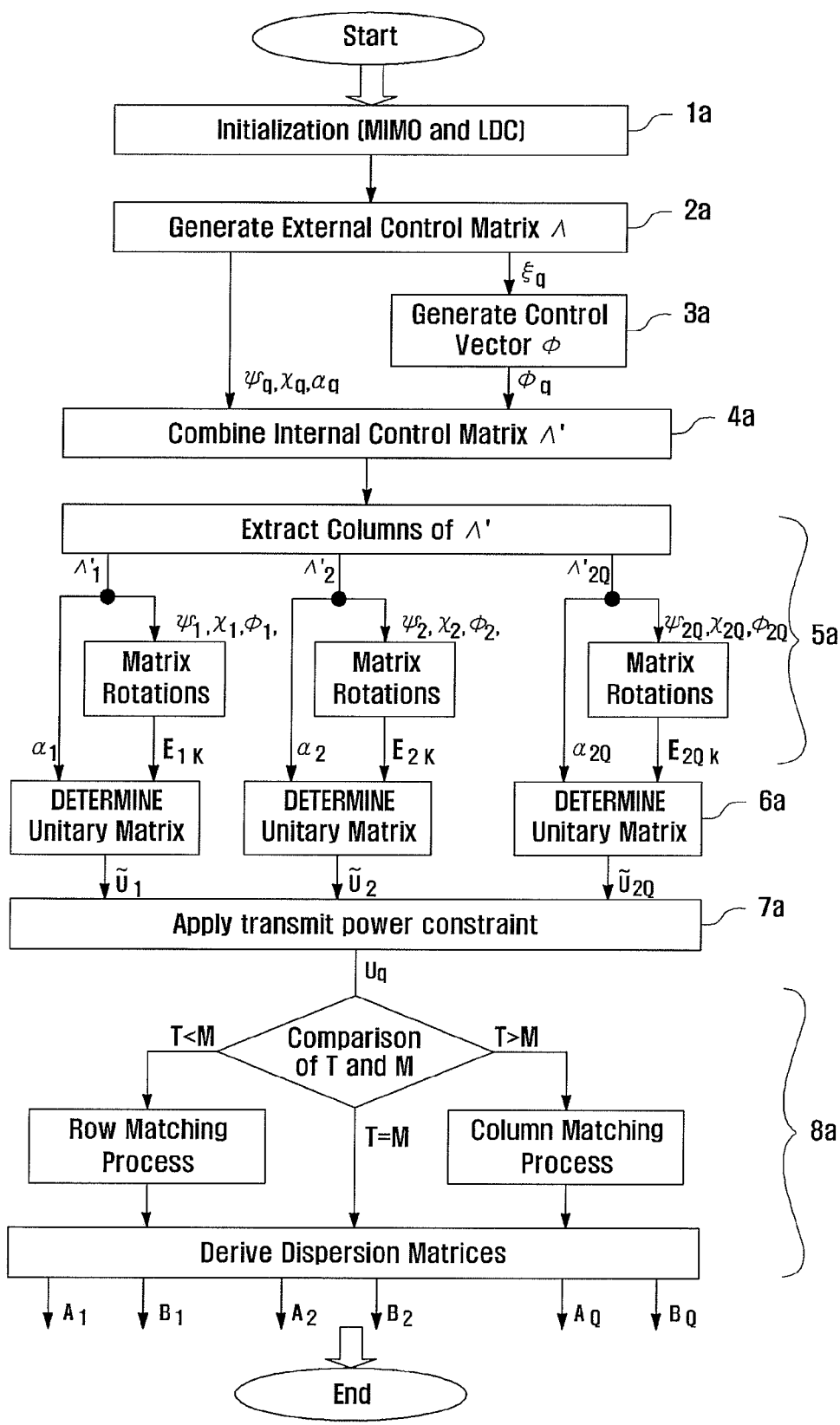
FIG. 1 is a flowchart illustrating a method for generating a Linear Dispersion Codes (LDC) including a plurality of dispersion matrices according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a single-user Multiple-Input Multiple-Output (MIMO) wireless communication system which employs Linear Dispersion Code (LDC) on a transmitter side, and LDC codes for such a system.

In an exemplary implementation, M denotes a number of transmit antennas and N denotes the number of receive antennas. A T×M LDC codeword matrix S, where T is the number of time slots each codeword spans over, and M is the number of transmit antennas, is defined by Equation (1):

$$S = \sum_{q=1}^{Q} (\alpha_q A_q + j\beta_q B_q), \quad (1)$$

wherein $\{A_q, B_q\}$ are a set of dispersion matrices, while the set of $\{\alpha_q, \beta_q\}$ are given by:

$$s_q = \alpha_q + j\beta_q, \quad q = 1, \ldots, Q, \quad (2)$$

and $S_q$ is a complex symbol from a given m-Phase Shift Key (PSK) or m-Quadrature Amplitude Modulation (QAM) constellation, where m is the size of constellation. In a quasi-static M×N Multiple-Input Multiple-Output (MIMO) system model, $$X = \sqrt{\frac{\rho}{M}} SH + V, \qquad (3)$$

wherein X is the T×N received signal matrix, H is the M×N channel matrix which is assumed to be constant during a duration of T, V is the T×N Additive White Gaussian Noise (AWGN) matrix whose entries are zero-mean, unit-variance, complex-Gaussian variables, and $\rho$ is the Signal-to-Noise Ratio (SNR) at each of the N receive antennas, independent of M.

An input data sequence is divided into a number of groups, each of which has Q constellation symbols. For each group of Q constellation symbols, an LDC encoding process is conducted, yielding a single codeword matrix S to be transmitted through M transmit antennas during T time slots. Therefore an effective code rate of the LDC is:

$$R_c = \frac{Q}{T}. \qquad (4)$$

Therefore the effective code rate of LDC is:

$$R = N_{bps} \cdot R_c, \qquad (5)$$

wherein $N_{bps}$ is the number of bits per constellation symbol ($N_{bps} = \log_2(m)$).

An exemplary embodiment of the present invention provides an LDC design framework, which is capable of producing the set of dispersion matrices $A_q$ and $B_q$ based on any given cost function (i.e., a criterion against which the LDC is optimized).

Accordingly, unitary LDCs may be beneficial to construct. Depending on the cost function, the optimized unitary LDC is likely to be different. Hence, in order to search for good LDCs, it may be beneficial to explore an entire (unbiased) space of unitary matrices of references [16] and [17] based on the LDC design constraints.

FIG. 1 is a flowchart illustrating a method for generating an LDC including a plurality of dispersion matrices according to an exemplary embodiment of the present invention.

Referring to FIG. 1, T, M and Q are initially determined wherein T, M and Q are real numbers. An integer K is also determined and given by K=max(T, M), i.e., integer K is equal to the larger of T and M (if T and M are not the same as each other) or is equal to T or M (if T and M are the same). A unitary LDC is then constructed.

In step 1a, the MIMO and LDC parameters are initialized by setting M, N, T, Q, $\rho$, and the like, which defines the scope of the LDC design.

In step 2a, an external control matrix $\Lambda$ is generated as follows:

$$\Lambda = [\Lambda_1, \Lambda_2, \ldots, \Lambda_{2Q}], \qquad (6)$$

wherein column vectors $\Lambda_q$ are given by:

$$\Lambda_q = [\psi_q^{(r,s)}, \chi_q^{(s)}, \xi_q^{(r,s)}, \alpha_q]^T, q=1,\ldots,2Q,$$
$$0 \le r < s \le K-1, \qquad (7)$$

and $\psi_q^{(r,s)}, \chi_q^{(s)}, \alpha_q, \xi_q^{(r,s)}$ q=1,...,2Q, 0≤r<s≤K-1 are real numbers within predefined ranges as follows:

$$\psi_q^{(r,s)} \in [0,2\pi), \chi_q^{(s)} \in [0,2\pi), \xi_q^{(r,s)} \in [0,1), \alpha_q \in [0,2\pi). \qquad (8)$$

In step 3a, a control vector $\phi$ is determined as follows:

$$\phi[\phi_1^{(r,s)}, \phi_2^{(r,s)}, \ldots, \phi_Q^{(r,s)}], \phi_q^{(r,s)} = \arcsin((\xi_q^{(r,s)})^{1/(2r+2)}), q=1,\ldots,2Q,$$
$$0 \le r \le s \le K-1 \qquad (9)$$

wherein $\xi_q^{(r,s)}$ is defined by Equations (7) and (8).

In step 4a, an internal control matrix $\Lambda'$ is created as follows:

$$\Lambda' = [\Lambda'_1, \Lambda'_2, \ldots, \Lambda'_{2Q}], \qquad (10)$$

wherein column vectors $\Lambda'_q$ are given by:

$$\Lambda'_q = [\psi_q^{(r,s)}, \chi_q^{(s)}, \phi_q^{(r,s)}, \alpha_q]^T, q=1,\ldots,2Q,$$
$$0 \le r < s \le K-1. \qquad (11)$$

In step 5a, for each of the 2Q column vectors of the internal control matrix $\Lambda'$, namely $\Lambda'_q$, q=1,...,2Q, K−1 rotated unitary matrices $E_{q,k}$ k=1,...,K−1 are constructed as follows:

$$E_{q,1} = E_q^{(K-1,K)}(\phi_q^{(0,1)}, \psi_q^{(0,1)}, \chi_q^{(1)}) \qquad (12)$$

$$E_{q,2} = E_q^{(K-2,K-1)}(\phi_q^{(1,2)}, \psi_q^{(1,2)}, 0) \cdot E_q^{(K-1,K)}(\phi_q^{(0,2)}, \psi_q^{(0,2)}, \chi_q^{(2)})$$

$$\vdots$$

$$E_{q,K-1} = E_q^{(1,2)}(\phi_q^{(K-2,K-1)}, \psi_q^{(K-2,K-1)}, 0) \cdot$$
$$E_q^{(2,3)}(\phi_q^{(K-3,K-1)}, \psi_q^{(K-3,K-1)}, 0) \cdots$$
$$E_q^{(K-1,K)}(\phi_q^{(0,K-1)}, \psi_q^{(0,K-1)}, \chi_q^{(K-1)}),$$

wherein the set of so-called elementary unitary matrices $E_q^{(r,s)}(\phi_q^{(r,s)}, \psi_q^{(r,s)}, \chi_q^{(s)})$ are given by:

$$E_q^{(r,s)} = \begin{bmatrix} E_{q,11}^{(r,s)} & E_{q,12}^{(r,s)} & \cdots & E_{q,1K}^{(r,s)} \\ E_{q,21}^{(r,s)} & E_{q,22}^{(r,s)} & \cdots & E_{q,2K}^{(r,s)} \\ \vdots & \vdots & \ddots & \vdots \\ E_{q,K1}^{(r,s)} & E_{q,K2}^{(r,s)} & \cdots & E_{q,KK}^{(r,s)} \end{bmatrix}, \qquad (13)$$

wherein (14)

$$E_{q,kk}^{(r,s)} = 1, k=1,\ldots,K; k \ne r, s$$
$$E_{q,rr}^{(r,s)} = \cos\phi_q^{(r,s)} \cdot \exp(j\psi_q^{(r,s)})$$
$$E_{q,rs}^{(r,s)} = \sin\phi_q^{(r,s)} \cdot \exp(j\chi_q^{(s)})$$
$$E_{q,sr}^{(r,s)} = -\sin\phi_q^{(r,s)} \cdot \exp(-j\chi_q^{(s)})$$
$$E_{q,ss}^{(r,s)} = \cos\phi_q^{(r,s)} \cdot \exp(-j\psi_q^{(r,s)}).$$

In step 6a, the 2Q unitary matrices $\tilde{U}_q$, q=1,...,2Q are determined by Equation (15):

$$\tilde{U}_q = \exp(j\alpha_q) \cdot E_{q,1} \cdot E_{q,2} \cdots E_{q,K-1}, q=1,\ldots,2Q. \qquad (15)$$

In step 7a, the transmit power constraint is applied to the unitary matrices as follows:

$$U_q = \sqrt{\frac{K}{Q}} \cdot \tilde{U}_q. \qquad (16)$$

The transmit power constraint applied to the unitary matrices is a stringent constraint to ensure that real and imaginary parts of the constellation symbols, namely $\alpha_q$, $\beta_q$ are dispersed with equal energy in both temporal and spatial domains.

In step 8a, the LDC dispersion matrices based on the dimension requirement are determined as follows:
if T=M, the dispersion matrices are given by:

$$\begin{cases} A_q = U_q, & q=1,\ldots,Q \\ B_q = U_q, & q=Q+1,\ldots,2Q \end{cases}, \qquad (17)$$

if T<M, the dispersion matrices are given by:

$$\begin{cases} A_q = Mat(GetRows(U_q, T)), & q=1,\ldots,Q \\ B_q = Mat(GetRows(U_q, T)), & q=Q+1,\ldots,2Q \end{cases}, \qquad (18)$$

wherein a function GetRows(U, T) denotes an operation of selecting T rows out of K rows in matrix U, while a function Mat( ) denotes a matrixing operation with the selected T rows, namely to form a new T×M matrix into which the selected rows are fitted.

If T>M, the dispersion matrices are given by:

$$\begin{cases} A_q = Mat\,(GetCols\,(U_q, M)), & q = 1, \ldots, Q \\ B_q = Mat\,(GetCols\,(U_q, M)), & q = Q+1, \ldots, 2Q \end{cases} \quad (19)$$

wherein a function GetCols(U, M) denotes an operation of selecting M columns out of K columns in matrix U, while a function Mat( ) denotes a matrixing operation with the selected M columns, namely to form a new T×M matrix into which the selected columns are fitted.

In an exemplary implementation, a new LDC representation for storage reduction is provided.

By varying an external control matrix Λ, the full space of unitary matrices may be explored according to a unique Haar measure. This mapping provides a convenient framework, where any numerical search algorithms may be employed to search the unconstrained ranges defined in Equation (8), while the output matrices $A_q$ and $B_q$ are strictly unitary.

Furthermore, for any given unitary LDC, at least one external control matrix Λ exists, which fully defines this code. For example, an Alamouti code of reference [2], interpreted in the form of LDC as follows:

$$A_1 = \begin{bmatrix} 1 & 0 \\ 0 & 1 \end{bmatrix}, \quad (20)$$

$$B_1 = \begin{bmatrix} 1 & 0 \\ 0 & -1 \end{bmatrix},$$

$$A_2 = \begin{bmatrix} 0 & 1 \\ -1 & 0 \end{bmatrix},$$

$$B_2 = \begin{bmatrix} 0 & 1 \\ 1 & 0 \end{bmatrix},$$

may be specified by an external control matrix formulated by:

$$\Lambda = \begin{bmatrix} \psi_1^{(r,s)} & \psi_2^{(r,s)} & \psi_3^{(r,s)} & \psi_4^{(r,s)} \\ \chi_1^{(s)} & \chi_2^{(s)} & \chi_3^{(s)} & \chi_4^{(s)} \\ \xi_1^{(r,s)} & \xi_2^{(r,s)} & \xi_3^{(r,s)} & \xi_4^{(r,s)} \\ \alpha_1 & \alpha_2 & \alpha_3 & \alpha_4 \end{bmatrix} = \begin{bmatrix} 0 & \frac{3\pi}{2} & 0 & 0 \\ 0 & 0 & 0 & \frac{3\pi}{2} \\ 0 & 0 & 1 & 1 \\ 0 & \frac{\pi}{2} & 0 & \frac{\pi}{2} \end{bmatrix}. \quad (21)$$

An inverse transformation suggests that for existing unitary LDCs, a storage requirement may be reduced. In the above example, using a conventional representation for the Alamouti code, non-zero numbers are required. However, in an exemplary implementation, only six non-zero numbers are required. Accordingly, a 25% storage reduction may result.

Moreover, new representation of existing unitary LDCs enables the code search procedure to start from these existing codes, which may serve as good starting points for finding better codes.

Figure 2:
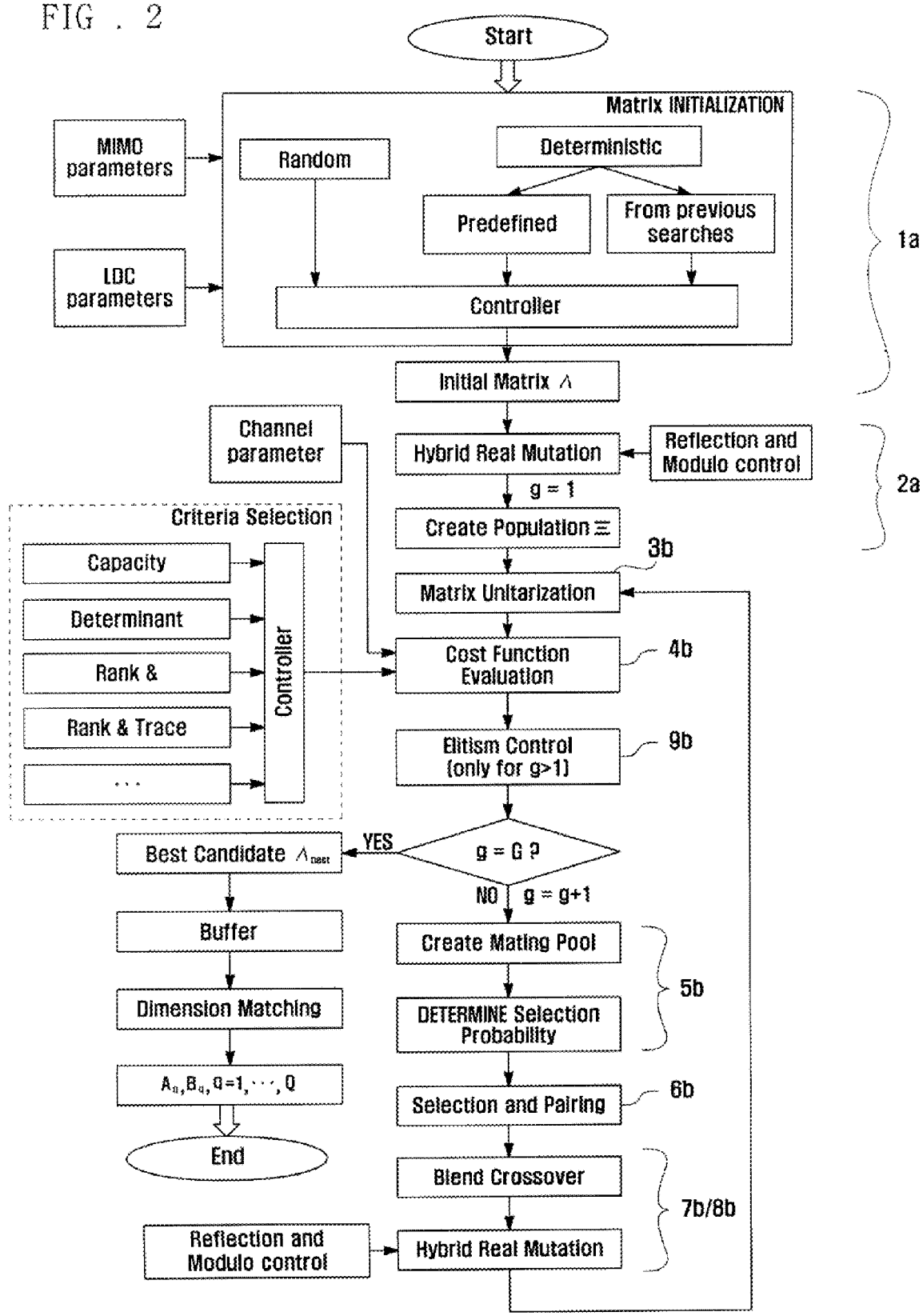
FIG. 2 is a flowchart illustrating a method for generating LDCs and selecting an optimum LDC for use in a Multiple-Input Multiple-Output (MIMO) communication system according to an exemplary embodiment of the present invention.

FIG. 2 is a flowchart illustrating a method for generating LDCs and selecting an optimum LDC for use in a MIMO communication system according to an exemplary embodiment of the present invention.

Referring to FIG. 2, K=max(T, M).

In step 1b, an external control matrix Λ is generated as follows:

$$\Lambda = [\Lambda_1, \Lambda_2, \ldots, \Lambda_{2Q}], \quad (22)$$

wherein column vectors are given by Equation (23):

$$\Lambda_q[\psi_q^{(r,s)}, \chi_q^{(s)}, \xi_q^{(r,s)}, \alpha_q]^T, q = 1, \ldots, 2Q, \quad (23)$$

and $\psi_q, \chi_q, \xi_q, \alpha_q$, q=1, . . . ,2Q are real numbers within given ranges:

$$\psi_q \in [0,2\pi), \chi_q \in [0,2\pi), \xi_q \in [0,1), \alpha_q \in [0,2\pi). \quad (24)$$

The values of $\psi_q, \chi_q, \xi_q, \alpha_q$ may be generated in a random manner, or based on deterministic rules, for example, by transforming an existing LDC matrices (following a method as described above) or by using the values optimized in a previous search.

In step 2b, a set (population) that consists of P matrices are created with the aid of a hybrid real mutation operator as follows:

$$\Xi = \{\Lambda[i]\}, i=1, \ldots, P. \quad (25)$$

More specifically, a modulo-($2\pi$) operator is applied to $\psi_q$, $\chi_q, \alpha_q$ and a reflection operator is applied to $\xi_q$, respectively, ensuring that their mutated values fall within the required ranges, as specified in Equation (8), are as follows:

$$\psi_{q,new} = (\psi_{q,old} + \lambda \cdot \Delta) \bmod(2\pi) \quad (26)$$

$$\chi_{q,new} = (\chi_{q,old} + \lambda \cdot \Delta) \bmod(2\pi)$$

$$\alpha_{q,new} = (\alpha_{q,old} + \lambda \cdot \Delta) \bmod(2\pi)$$

$$\xi_{q,new} = \begin{cases} -\xi, & \text{if } \xi < 0 \\ 2-\xi, & \text{if } \xi > 1 \end{cases}, \quad \xi = \xi_{q,old} + \lambda \cdot \Delta,$$

wherein $\Delta = 1/(2\pi)$ and $\lambda \in \{1,-1\}$. The set Ξ is referred to as a Generation, and each matrix in Ξ is an Individual.

In step 3b, for each Individual, a matrix unitarization process is invoked in order to transform each Individual to a 2Q number of unitary dispersion matrices (using the method described above in relation to FIG. 1) $A_q$ and $B_q$, q=1, . . . , Q.

In step 4b, the dispersion matrices, which fully specify an LDC, are evaluated using a so-called cost function, implementing a selected criterion (or combination of criteria). Different criteria may be flexibly plugged in and/or combined, as indicated by the "Criteria Selection" box in FIG. 2. The evaluation process will assign a score to each Individual, which suggest their fitness with respect to the specific criteria.

More detail regarding the cost function evaluation is described below:

The cost function evaluation may be done with a single cost function or multiple cost functions in one of the following ways:

Evaluate a single cost function
Evaluate multiple cost functions by either methods:
    Step-by-step evaluation:
        Set a threshold for each of the cost functions to be tested:
            Ta for cost function CFa
            Tb for cost function CFb
            Tc for cost function CFc
            etc
        All individuals in a current population are first tested by CFa.
            Individuals having a result lower than Ta will not be selected to form a mating pool
            Individuals having a result higher than Ta will be tested by CFb.
                Individuals having a result lower than Tb will not be selected to form the mating pool
                Individuals having a result higher than Tb will be tested by CFc, and the like.

Joint evaluation:
　　Set a weighting factor for each of the cost functions to be tested
　　　　Wa for cost function CFa
　　　　Wb for cost function CFb
　　　　Wc for cost function CFc
　　　　etc
　　Evaluate all cost functions and get results:
　　　　Ra from cost function CFa
　　　　Rb from cost function CFb
　　　　Rc from cost function CFc
　　　　etc
　　Combine all result as a weighted sum:
　　　　Final result=Wa*Ra+Wb*Rb+Wc*Rc+etc In step 5b, the individuals with high fitness will be selected to form a mating pool, where each of the individuals is assigned a selection probability.

In step 6b, based on the selection probability distribution, two individuals are selected at one time and form a parent pair. The total number of parent pairs is P/2.

In steps 7b and 8b, each parent pair is subject to a blend crossover and the aforementioned hybrid mutation, resulting in two new Individuals. All new Individuals will form a new Generation and their fitness will be evaluated accordingly in steps 3b and 4b.

In step 9b, for the sake of keeping good Individuals, an elitism control function is applied, which replaces a few worst new Individuals by the same number of best Individuals from the previous Generation. Again, the refined new Generation will go through steps 5b to 8b.

The iterative optimization will terminate when the index of Generation reaches a maximum predefined value of G. Finally, the best Individual, namely the matrix $A_{best}$ that yields the highest result during cost function evaluation, will be considered as the solution.

Corresponding unitary dispersion matrices $U_q$, q=1, . . . ,2Q may be retrieved from a buffer. Further, a "Dimension Matching" procedure illustrated in FIG. 2 is invoked, which may provide non-square LDCs, wherein:

if T=M, dispersion matrices are given by:

$$\begin{cases} A_q = U_q, & q = 1, \ldots, Q \\ B_q = U_q, & q = Q+1, \ldots, 2Q \end{cases} \quad (27)$$

if T<M, the dispersion matrices are given by:

$$\begin{cases} A_q = Mat(GetRows(U_q, T)), & q = 1, \ldots, Q \\ B_q = Mat(GetRows(U_q, T)), & q = Q+1, \ldots, 2Q \end{cases} \quad (28)$$

wherein a function GetRows(U, T) denotes an operation of selecting T rows out of K rows in matrix U, while a function Mat( ) denotes a matrixing operation with the selected T rows, namely to form a new T×M matrix into which the selected rows are fitted.

If T>M, the dispersion matrices are given by:

$$\begin{cases} A_q = Mat(GetCols(U_q, M)), & q = 1, \ldots, Q \\ B_q = Mat(GetCols(U_q, M)), & q = Q+1, \ldots, 2Q \end{cases} \quad (29)$$

wherein a function GetCols(U, M) denotes an operation of selecting M columns out of K columns in matrix U, while a function Mat( ) denotes a matrixing operation with the selected M columns, namely to form a new T×M matrix into which the selected columns are fitted.

Figure 3:
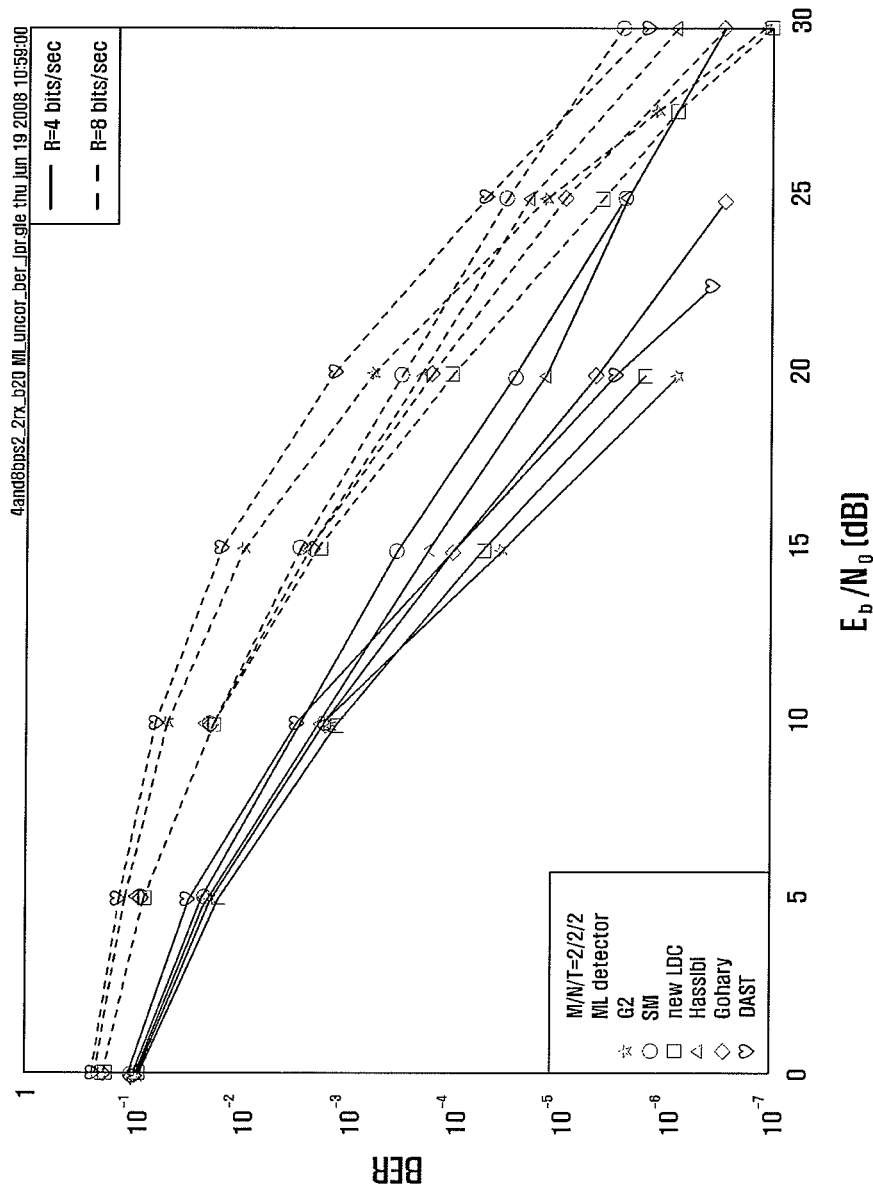
FIG. 3 is a plot graph illustrating a bit error rate performance of an LDC generated according to an exemplary embodiment of the present invention.

FIG. 3 is a plot graph illustrating a bit error rate performance of an LDC generated in a method according to an exemplary embodiment of the present invention.

Figure 4:
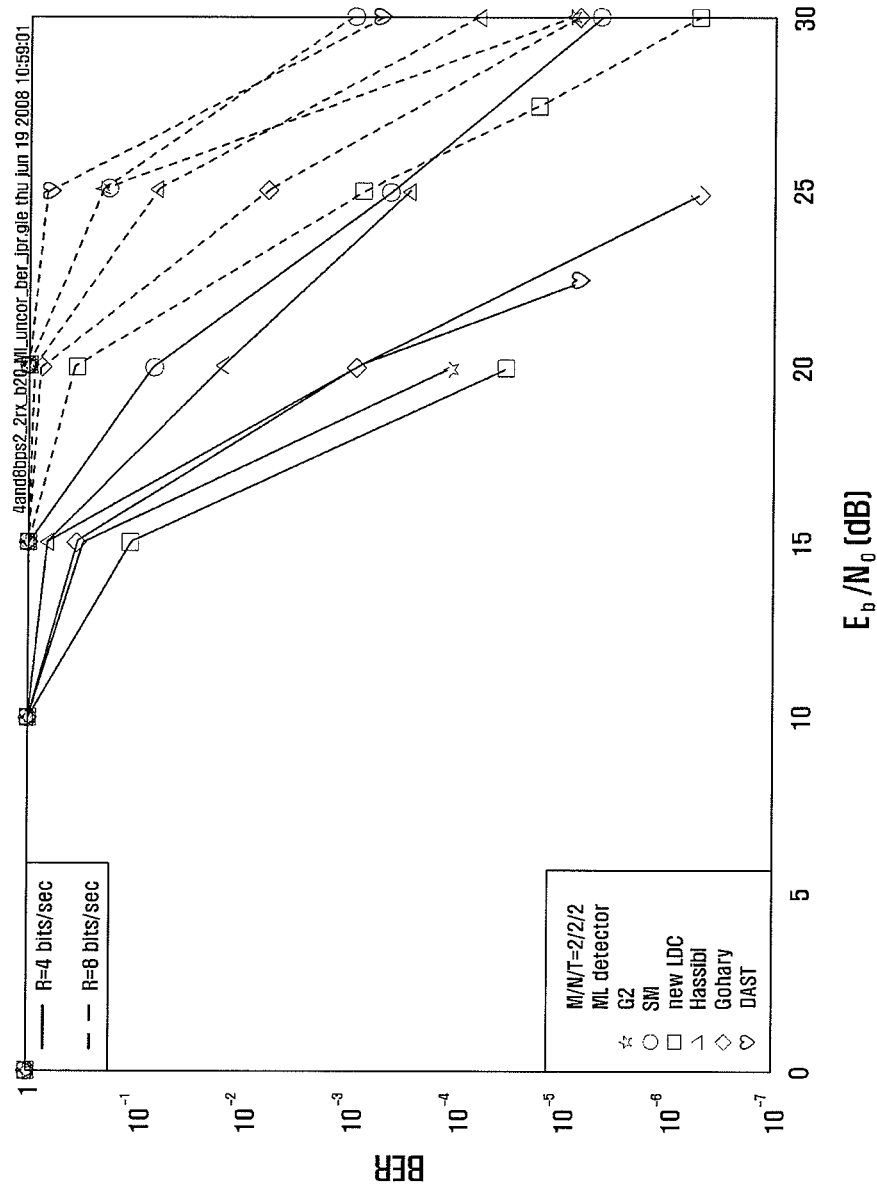
FIG. 4 is a plot graph illustrating a frame error ratio performance of an LDC generated according to an exemplary embodiment of the present invention.

FIG. 4 is a plot graph illustrating a frame error ratio performance of an LDC generated according to an exemplary embodiment of the present invention.

Referring to FIGS. 3 and 4, preliminary performance results are provided, comparing a newly designed LDC, according to an exemplary embodiment of the present invention, to reference/State-of-Art (SoA) existing MIMO Schemes and LDCs, namely:
　　G2—the Alamouti code in reference [2];
　　SM—a V-BLAST scheme in reference [4];
　　Hassibi—the LDC in reference [1];
　　Gohary—the LDC in reference [6];
　　DAST—the code in reference [9].

As illustrated in FIGS. 3 and 4, the new LDC outperforms all its counterparts in terms of Frame Error Ratio (FER), while being better than most codes in terms of Bit Error Ratio (BER). This demonstrates the potential of generating new high-performance LDCs.

Figure 5:
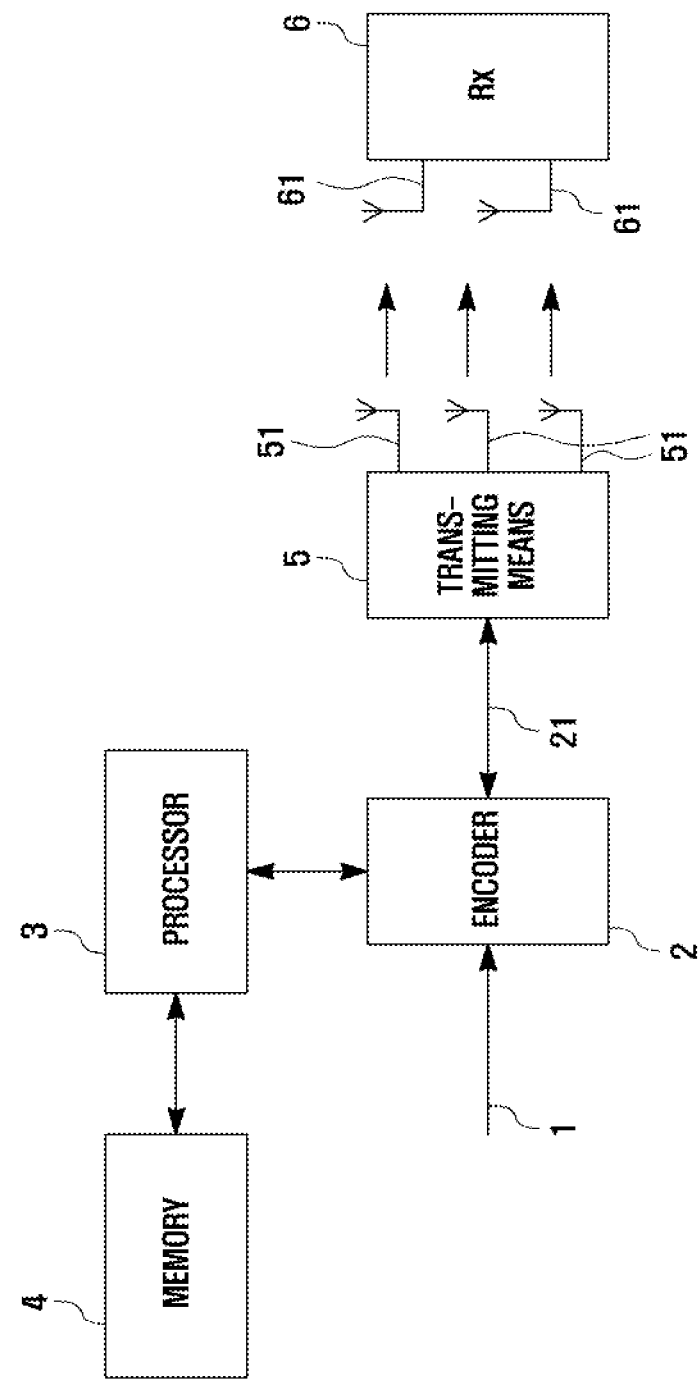
FIG. 5 is a schematic representation of MIMO communication apparatus according to an exemplary embodiment of the present invention.

FIG. 5 is a schematic representation of a MIMO communication apparatus according to an exemplary embodiment of the present invention.

Referring to FIG. 5, the MIMO communication apparatus is part of a MIMO communication system in which a plurality of transmit antennas 51 are used to transmit encoded data in the form of code words. Each code word is transmitted over T time slots and each code word encodes Q constellation symbols. The transmitted encoded data (i.e., the transmitted code words) are received by a receiver means of the MIMO system 6 having a plurality of receive antennas 61. The MIMO communication apparatus on the transmitting side includes an encoder 2 arranged to receive unencoded data 1 and to encode the unencoded data into a plurality of code words using an LDC. In this example, the LDC used by the encoder is provided by a processor 3 or processing means. The processor 3 generates LDCs according to at least one of the methods defined above, and supplies a generated LDC for use by the encoder. The processor 3 responds to changes in the MIMO parameters, such as, when the number of receive antennas 61 changes, the signal to noise ratio at each receiver antenna changes, or the number of time slots for transmitting each code word changes. In response to the changes, the processor 3 calculates a new LDC, appropriate to the new combination of MIMO parameters, and supplies new LDC to the encoder 2. In an exemplary implementation, the transmit side of the apparatus further includes a memory 4 which stores a plurality of previously generated LDCs including LDCs generated according to an exemplary embodiment of the present invention. The processor is adapted such that it does not necessarily have to generate an LDC for use by the encoder 2. Instead, according to the MIMO parameters (e.g., the current combination of MIMO parameters, if the MIMO parameters are changing with time), the processor 3 is able to select an appropriate LDC from memory 4 and supply the LDC to the encoder 2 for use. Additionally, the processor 3 may use an LDC selected from the memory 4 as a starting point for generating one or more new LDCs according to an exemplary embodiment of the present invention. As described above, the encoder 2 uses the LDC supplied by the processor 3 to encode the data 1 and supplies the encoded data 21 to the transmitting means 5 which includes the plurality of transmit antennas 51.

Figure 6:
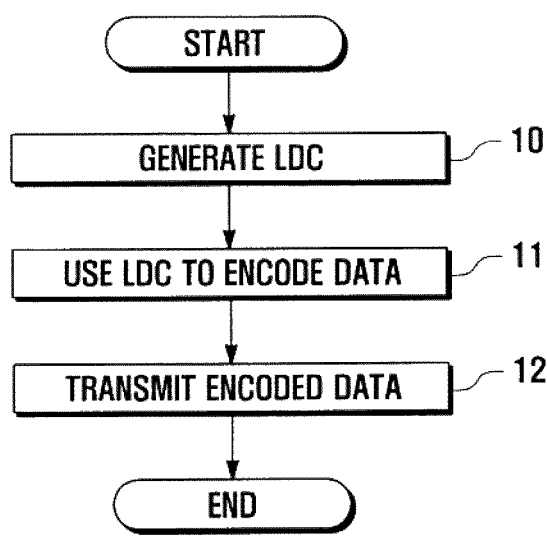
FIG. 6 is a flowchart illustrating a communication method according to an exemplary embodiment of the present invention.

FIG. 6 is a flowchart illustrating a communication method according to an exemplary embodiment of the present invention.

Referring to FIG. 6, in step 10, an LDC is generated in a MIMO system. In step 11, the generated LDC is used to encode data. In step 12, the encoded data is transmitted from a plurality of transmit antennas over a plurality of time slots.

Figure 7:
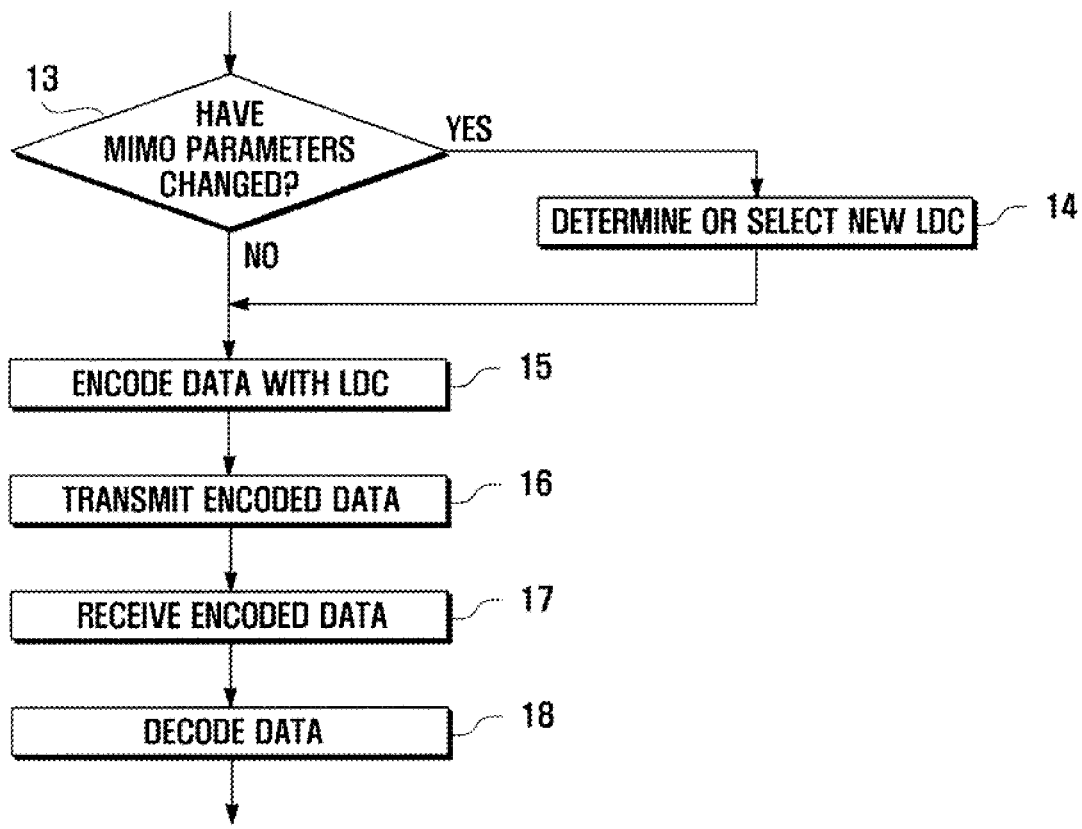
FIG. 7 is a flowchart illustrating a communication method according to an exemplary embodiment of the present invention.

FIG. 7 is a flowchart illustrating a communication method according to an exemplary embodiment of the present invention.

Referring to FIG. 7, in step 13, a determination is made as to whether MIMO parameters have changed since the LDC currently being used was generated or selected in a MIMO system. If the parameters have changed, then a new LDC is determined or selected in step 14 according to a new combination of MIMO parameters. In step 15, the existing LDC or new LDC is used to encode data. The encoded data is then transmitted in step 16. In step 17, the encoded data is received by a MIMO receiver which includes a plurality of receiver antennas 61. Within the MIMO receiver, the received encoded data is then decoded in step 18.

In the apparatus illustrated in FIG. 5, the encoder 2, the memory 4, the processor 3 and the transmitting means 5 may be included in any one of the MIMO communication system entities, such as, a mobile device or a non-mobile part of the system, such as a base station or an enhanced Node B (eNB). Similarly, the receiver 6, which includes a plurality of receive antennas 61, may be part of a mobile device or a non-mobile device.

The methods illustrated in FIGS. 6 and 7 may be implemented by a mobile device, a non-mobile device or system of components in a MIMO communication system. For example, step 13 to step 16 illustrated in FIG. 7 may be implemented by a transmitting base station, and step 17 and step 18 may be implemented by a mobile device receiving transmitting code words.

Figure 8:
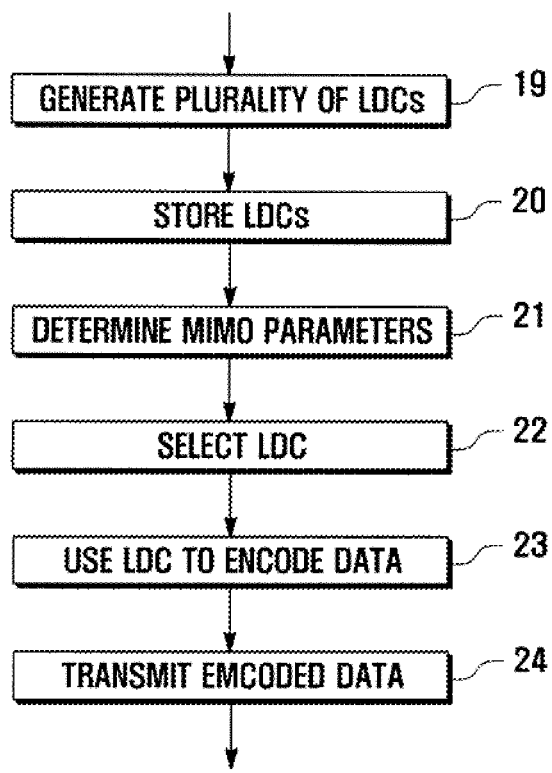
FIG. 8 is a flowchart illustrating a communication method according to an exemplary embodiment of the present invention.

FIG. 8 is a flowchart illustrating a communication method according to an exemplary embodiment of the present invention.

Referring to FIG. 8, in step 19 a plurality of LDCs are generated according to an exemplary embodiment of the present invention. The generated LDCs are then stored in a suitable memory means in step 20. In step 21, current MIMO system parameters are determined. According to the determined parameters, an appropriate LDC is selected from the memory means in step 22. The selected LDC is then used to encode data in step 23, before the encoded data is transmitted in step 24. Step 19 to step 24 may, for example, be performed in one part of the MIMO system, such as, a mobile device or in a base station. Alternatively, step 19 to step 24 may be distributed or shared between more than one part of a MIMO system. For example, the generation and storing of the LDCs may be performed at a remote location. A mobile device may then perform the step of determining current MIMO parameters and remotely access the memory to select an LDC appropriate to current conditions in step 22. The mobile device may then use the selected LDC to encode data before transmitting the encoded data for remote reception.

Exemplary embodiments of the present invention can be implemented in the form of hardware, software or a combination of hardware and software. Any such software may be stored in the form of a volatile or a non-volatile storage, such as, for example, a storage device, an erasable or rewritable ROM, or in the form of a memory, such as, for example, a RAM, memory chips, a device or integrated circuits or on an optically or magnetically readable medium, such as, for example, a CD, a DVD, a magnetic disk, magnetic tape, and the like. The storage devices and storage media are exemplary embodiments of machine-readable storage that are suitable for storing a program or programs including instructions that, when executed, implement exemplary embodiments of the present invention. Accordingly, exemplary embodiments of the present invention provide a program including code for implementing a system or method and a machine-readable storage storing such a program. Still further, such programs may be conveyed electronically via any medium, such as, a communication signal carried over a wired or wireless connection, and exemplary embodiments that suitably encompass the same.

While the invention has been shown and described with reference to certain exemplary embodiments thereof, it will be understood by those skilled in the art that various changes in form and details may be made therein without departing from the spirit and scope of the invention as defined by the appended claims and their equivalents.

The references made in the above description correspond to the following documents (the contents of which are hereby incorporated by reference):

[1] B. Hassibi and B. M. Hochwald, "High-rate codes that are linear in space and time," IEEE Trans. Inf. Theory, vol. 48, no. 7, pp. 1804-1824, Apr. 24, 2001.

[2] S. M. Alamouti, "A simple transmitter diversity scheme for wireless communications," IEEE J. Select. Areas Commun., pp. 1451-1458, October 1998.

[3] V. Tarokh, H. Jafarkhani, and A. R. Calderbank, "Space-time block codes from orthogonal designs," IEEE Trans. Inform. Theory, vol. 45, pp. 1456-1467, July 1999.

[4] G. J. Foschini, G. D. Golden, R. A. Valenzuela, and P. W. Wolniansky, "Simplified processing for high spectral efficiency wireless communication employing multi-element arrays," IEEE J. Select. Areas Commun., vol. 17, pp. 1841-1852, November 1999.

[5] R. W. Heath and A. J. Paulraj, "Linear dispersion codes for MIMO systems based on frame theory," IEEE Trans. Signal Process., vol. 50, no. 10, pp. 2429-2441, October 2002.

[6] R. H. Gohary and T. N. Davidson, "Design of linear dispersion codes: asymptotic guidelines and their implementation," IEEE Trans. Wireless Commun., vol. 4, no. 6, pp. 2892-2906, November 2005.

[7] X. Wang, V. Krishnamurthy and J. Wang, "Stochastic gradient algorithms for design of minimum error-rate linear dispersion codes in MIMO wireless systems," IEEE Trans. Signal Process. vol. 54, no. 4, pp. 1242-1255, April 2006.

[8] M. O. Damen, K. Abed-Meraim, and J.-C. Belfiore, "Diagonal algebraic space-time block codes," IEEE Trans. Inform. Theory, vol. 48, pp. 628-636, March 2002.

[9] M. O. Damen and N. C. Beaulieu, "On diagonal algebraic space-time block codes," IEEE Trans. Commun., vol. 51, no. 6, pp. 911-919, June 2003.

[10] H. El Gamal and A. R. Hammons Jr., "On the design of algebraic space-time codes for MIMO block-fading channels," IEEE Trans. Inform. Theory, vol. 49, no. 1, pp. 151-163, January 2003.

[11] H. El Gamal, and M. O. Damen, "Universal space-time coding," IEEE Trans. Inform. Theory, vol. 49, no. 5, pp. 1097-1119, May 2003.

[12] J.-C. Belfiore, G. Rekaya and E. Viterbo, "The golden code: a 2×2 full-rate space-time code with nonvanishing determinants," IEEE Trans. Inform. Theory, vol. 51, no. 4, pp. 1432-1436, April 2005.

[13] F. Oggier, G. Rekaya, J.-C. Belfiore and E. Viterbo, "Perfect Space-Time Block Codes," IEEE Trans. Inform. Theory, vol. 52, no. 9, pp. 3885-3902, September 2006.

[14] F. Mezzadri, "How to Generate Random Matrices from the Classical Compact Groups," Notices of the AMS, vol. 54, no. 5, pp. 592-604, May 2007.

[15] G. H. Golub and C. F. van Loan, Matrix Computations, 3rd ed. Baltimore, Md.: The Johns Hopkins Univ. Press, 1996.

[16] M. Pozniak, K. Zyczkowski and M. Kus, "Composed Ensembles of Random Unitary Matrices," Journal of Physics A: Mathematical and General, vol. 31, no. 3, pp. 1059-1071, 1998.

[17] G. H. Golub and C. F. Van Loan, Matrix Computations, 3rd Ed., The Johns Hopkins University Press, 1996.

What is claimed is:

1. A method for generating a Linear Dispersion Code (LDC) for use in a Multiple-Input Multiple-Output (MIMO) communication system in which M transmit antennas are used to transmit a codeword over T time slots, each codeword encoding Q constellation symbols, the method comprising:
   determining M, T and Q, wherein M, T and Q are real numbers;
   generating a first matrix having 2Q columns and a predefined number m of rows, each column comprising a plurality of elements and each element being a real number within a respective predefined range for the respective row;
   deriving a second matrix having 2Q columns and m rows from the first matrix such that the elements of one row of the second matrix are dependent upon the corresponding elements of a corresponding row of the first matrix, and upon M and T;
   deriving a set of 2Q LDC dispersion matrices, each 2Q LDC dispersion matrix comprising dimensions T×M, from the second matrix;
   encoding data with one of the 2Q LDC dispersion matrices; and
   transmitting the encoded data.

2. The method in accordance with claim 1, wherein the deriving of the set of 2Q LDC dispersion matrices comprises constructing a set of rotated unitary matrices for each of the 2Q column vectors of the second matrix.

3. The method in accordance with claim 2, wherein the deriving of the set of 2Q LDC dispersion matrices comprises generating a set of 2Q unitary matrices, each unitary matrix being determined from a respective set of the rotated unitary matrices.

4. The method in accordance with claim 3, wherein the deriving of the set of 2Q LDC dispersion matrices comprises applying a power constraint to the set of 2Q unitary matrices to generate a corresponding set of 2Q power constrained unitary matrices.

5. The method in accordance with claim 4, wherein the deriving of the set of 2Q LDC dispersion matrices comprises constructing the set of 2Q LDC dispersion matrices from the set of 2Q power constrained unitary matrices.

6. The method in accordance with claim 5, wherein the constructing of the set of 2Q LDC dispersion matrices is dependent upon relative sizes of T and M.

7. The method in accordance with claim 1, wherein m is equal to 4.

8. The method in accordance with claim 1, wherein the first matrix is a matrix $\Lambda$, where $$\Lambda = [\Lambda_1, \Lambda_2, \ldots, \Lambda_{2Q}],$$

wherein column vectors $\Lambda_q$ are given by:

$$\Lambda_q = [\psi_q^{(r,s)}, \chi_q^{(s)}, \xi_q^{(r,s)}, \alpha_q]^T, q=1, \ldots, 2Q,$$
$$0 \leq r < s \leq K-1,$$

and $\psi_q^{(r,s)}, \chi_q^{(s)}, \alpha_q, \xi_q^{(r,s)}$, q=1, \ldots, 2Q, $0 \leq r < s \leq K-1$ are real numbers within the predefined ranges:

$$\psi_q^{(r,s)} \in [0, 2\pi), \chi_q^{(s)} \in [0, 2\pi), \xi_q^{(r,s)} \in [0,1), \alpha_q \in [0, 2\pi)$$

and K is an integer equal to the larger of M and T, if M and T are not equal, or equal to M or T, if M and T are equal.

9. The method in accordance with claim 8, wherein the deriving of the second matrix comprises calculating a vector $\phi$, where:

$$\phi = [\phi_1^{(r,s)}, \phi_2^{(r,s)}, \ldots, \phi_Q^{(r,s)}], \phi_q^{(r,s)} = \arcsin((\xi_q^{(r,s)})^{1/(2r+2)}), q=1, \ldots, 2Q,$$
$$0 \leq r < s \leq K-1.$$

10. The method in accordance with claim 9, wherein the second matrix is a matrix $\Lambda'$, where:

$$\Lambda' = [\Lambda'_1, \Lambda'_2, \ldots, \Lambda'_{2Q}],$$

wherein column vectors $\Lambda'_q$ are given by:

$$\Lambda'_q = [\psi_q^{(r,s)}, \chi_q^{(s)}, \phi_q^{(r,s)}, \alpha_q]^T, q=1, \ldots, 2Q, 0 \leq r < s \leq K-1.$$

11. The method in accordance with claim 10, wherein the deriving of the set of 2Q LDC dispersion matrices comprises, for each of the 2Q column vectors of $\Lambda'$, namely $\Lambda'_q$, q=1, \ldots, 2Q, constructing K-1 rotated unitary matrices $E_{q,k}$, k=1, \ldots, K-1:

$$E_{q,1} = E_q^{(K-1,K)}(\phi_q^{(0,1)}, \psi_q^{(0,1)}, \chi_q^{(1)})$$

$$E_{q,2} = E_q^{(K-2,K-1)}(\phi_q^{(1,2)}, \psi_q^{(1,2)}, 0) \cdot E_q^{(K-1,K)}(\phi_q^{(0,2)}, \psi_q^{(0,2)}, \chi_q^{(2)})$$

$$\vdots$$

$$E_{q,K-1} = E_q^{(1,2)}(\phi_q^{(K-2,K-1)}, \psi_q^{(K-2,K-1)}, 0) \cdot E_q^{(2,3)}(\phi_q^{(K-3,K-1)}, \psi_q^{(K-3,K-1)}, 0)$$
$$\cdots \cdot E_q^{(K-1,K)}(\phi_q^{(0,K-1)}, \psi_q^{(0,K-1)}, \chi_q^{(K-1)}),$$

wherein the set of elementary unitary matrices $E_q^{(r,s)}(\phi_q^{(r,s)}, \psi_q^{(r,s)}, \chi_q^{(s)})$ are given by:

$$E_q^{(r,s)} = \begin{bmatrix} E_{q,11}^{(r,s)} & E_{q,12}^{(r,s)} & \cdots & E_{q,1K}^{(r,s)} \\ E_{q,21}^{(r,s)} & E_{q,22}^{(r,s)} & \cdots & E_{q,2K}^{(r,s)} \\ \vdots & \vdots & \ddots & \vdots \\ E_{q,K1}^{(r,s)} & E_{q,K2}^{(r,s)} & \cdots & E_{q,KK}^{(r,s)} \end{bmatrix},$$

where:

$$E_{q,kk}^{(r,s)} = 1, k = 1, \ldots, K; k \neq r, s$$

$$E_{q,rr}^{(r,s)} = \cos\phi_q^{(r,s)} \cdot \exp(j\psi_q^{(r,s)})$$

$$E_{q,rs}^{(r,s)} = \sin\phi_q^{(r,s)} \cdot \exp(j\chi_q^{(s)})$$

$$E_{q,sr}^{(r,s)} = -\sin\phi_q^{(r,s)} \cdot \exp(-j\chi_q^{(s)})$$

$$E_{q,ss}^{(r,s)} = \cos\phi_q^{(r,s)} \cdot \exp(-j\psi_q^{(r,s)}).$$

12. The method in accordance with claim 11, wherein the deriving of the set of 2Q LDC dispersion matrices comprises determining a set of 2Q unitary matrices $\tilde{U}_q$, q=1, \ldots, 2Q according to:

$$\tilde{U}_q = \exp(j\alpha_q) \cdot E_{q,1} \cdot E_{q,2} \ldots E_{q,K-1}, q=1, \ldots, 2Q.$$

13. The method in accordance with claim 12, wherein the deriving of the set of 2Q LDC dispersion matrices comprises applying a transmit power constraint to the unitary matrices to generate a set of power constrained unitary matrices according to:

$$U_q = \sqrt{\frac{K}{Q}} \cdot \tilde{U}_q.$$

14. The method in accordance with claim 13, wherein the deriving of the set of 2Q LDC dispersion matrices comprises deriving the LDC dispersion matrices from the power constrained unitary matrices based on a dimension requirement, such that:

if T=M, the dispersion matrices are given by:

$$\begin{cases} A_q = U_q, & q = 1, \ldots, Q \\ B_q = U_q, & q = Q+1, \ldots, 2Q \end{cases},$$

if T<M, the dispersion matrices are given by:

$$\begin{cases} A_q = Mat(GetRows(U_q, T)), & q = 1, \ldots, Q \\ B_q = Mat(GetRows(U_q, T)), & q = Q+1, \ldots, 2Q \end{cases},$$

wherein a function GetRows(U, T) denotes an operation of selecting T rows out of the K rows in matrix U, while a function Mat( ) denotes a matrixing operation with the selected T rows, namely to form a new T×M matrix into which the selected rows are fitted, and if T>M, the dispersion matrices are given by:

$$\begin{cases} A_q = Mat(GetCols(U_q, M)), & q = 1, \ldots, Q \\ B_q = Mat(GetCols(U_q, M)), & q = Q+1, \ldots, 2Q \end{cases},$$

wherein a function GetCols(U, M) denotes an operation of selecting M columns out of the K columns in matrix U, while a function Mat( ) denotes a matrixing operation with the selected M columns, namely to form a new T×M matrix into which the selected columns are fitted.

15. A method for generating at least a partially optimized Linear Dispersion Code (LDC) for use in a Multiple-Input Multiple-Output (MIMO) communication system in which M transmit antennas are used to transmit a codeword over T time slots, each codeword encoding Q constellation symbols, wherein M, T and Q are real numbers, the method comprising:
generating an initial matrix comprising 2Q columns and a predefined number M of rows;
generating a population of different individual matrices from the initial matrix;
deriving a respective second matrix comprising 2Q columns and M rows from each individual matrix;
generating a set of 2Q LDCs comprising a respective set of LDC dispersion matrices from each second matrix, each LDC dispersion matrix comprising dimensions T×M;
evaluating each LDC according to at least one criterion;
selecting one of the LDCs as the at least partially optimized LDC according to the results of the evaluation;
encoding data with the selected LDC; and
transmitting the encoded data.

16. The method in accordance with claim 15, wherein each column of the initial matrix comprises a plurality of elements and each element being a real number within a respective predefined range for the respective row, where the different individual matrices each comprise 2Q columns and M rows, each column comprising a plurality of elements, each element being a real number within the respective predefined range for the respective row, and each individual matrix being generated by operating on the initial matrix with a mutation operator, and
wherein the deriving of each respective second matrix from each individual matrix comprises deriving each respective second matrix such that the elements of one row of each second matrix are dependent upon the corresponding elements of the corresponding row of the respective individual matrix, and upon M and T.

17. The method in accordance with claim 16, wherein the mutation operator comprises a modulo operator and a reflection operator.

18. The method in accordance with claim 16, further comprising:
selecting a plurality of the individual matrices according to the evaluation to form a mating pool;
selecting pairs of the selected individual matrices from the mating pool to form a plurality of parent pairs;
processing each parent pair to generate a respective two new individual matrices of a new generation of matrices;
deriving a further set of LDCs, each corresponding to a respective one of the new individual matrices; and
evaluating each new LDC according to the at least one criterion.

19. The method in accordance with claim 18, wherein the processing of each parent pair comprises at least one of blending and mutating.

20. The method in accordance with claim 18, further comprising refining the new generation of matrices by replacing at least one of the new individual matrices with at least one individual matrix from a previous generation.

21. The method in accordance with claim 20, comprising repeating the selecting of the pairs of the selected individual matrices, the generation of a new generation, the evaluation of LDCs, and optionally repeating the refining, for a predefined number of generations.

22. The method in accordance with claim 15, wherein the selecting of one of the LDCs comprises selecting the LDC comprising a highest evaluation according to the at least one criterion.

23. A communication method for transmitting data in a plurality of codewords from a plurality of transmit antennas, each codeword encoding a plurality of constellation symbols and each codeword being transmitted over a plurality of time slots, the method comprising:
generating a plurality of Linear Dispersion Codes (LDCs) comprising a respective set of LDC dispersion matrices and corresponding to a different respective combination of T, M and Q values, wherein T, M and Q are real numbers;
storing the plurality of LDCs in a memory means;
determining a number M1 of transmit antennas in the plurality of transmit antennas;
determining a number Q1 of constellation symbols in the plurality of constellation symbols;
determining a number T1 of timeslots in the plurality of time slots;
selecting from the memory means an LDC corresponding to T, M and Q values equal to T1, M1 and Q1, respectively, wherein T1, M1 and Q1 are real numbers;
using the selected LDC to encode data into the plurality of codewords; and
transmitting the codewords from the M1 transmit antennas.

24. The method in accordance with claim 23, further comprising:
selecting a new LDC from the memory means in response to at least one of the numbers T1, M1 and Q1 changing, the new LDC corresponding to T, M and Q values equal to the new values of T1, M1 and Q1;
using the selected new LDC to encode data into a plurality of the codewords; and
transmitting the codewords from the M1 transmit antennas.

25. A communication method for transmitting data in a plurality of codewords from M transmit antennas, each codeword encoding Q constellation symbols and each codeword being transmitted over T time slots, the method comprising:
generating an initial matrix comprising 2Q columns and a predefined number M of rows;
deriving a respective second matrix comprising 2Q columns and m rows from each first matrix;
generating a set of 2Q Linear Dispersion Codes (LDCs) from each of the second matrices, the LDCs comprising a respective set of LDC dispersion matrices, each LDC dispersion matrix comprising dimensions T×M, wherein M, T and Q are real numbers;
determining a performance of the plurality of different LDCs according to at least one criterion;
selecting one of the LDCs according to its performance;
using the selected LDC to encode data into the plurality of codewords; and
transmitting the codewords from the transmit antennas.

26. The communication method in accordance with claim 25:
wherein each first matrix comprises a plurality of elements and each element being a real number within a respective predefined range for the respective row, and
wherein the deriving of each second matrix comprises deriving the respective second matrix such that the elements of one row of each second matrix are dependent upon corresponding elements of a corresponding row of the respective first matrix, and upon M and T.

* * * * *